(12) United States Patent
Behm et al.

(10) Patent No.: US 7,497,123 B1
(45) Date of Patent: Mar. 3, 2009

(54) DIRECT MOUNT FOR PRESSURE TRANSMITTER WITH THERMAL MANAGEMENT

(75) Inventors: Steven M. Behm, White Bear Lake, MN (US); William B. Krueger, Bloomington, MN (US); Jay W. Smith, Chanhassen, MN (US); Jeffrey P. Reddick, Minnetonka, MN (US); Jeffrey Graupmann, Excelsior, MN (US); Aaron Seelig, Minneapolis, MN (US)

(73) Assignee: Rosemount Inc., Eden Prairie, MN (US)

(*) Notice: Subject to any disclaimer, the term of this patent is extended or adjusted under 35 U.S.C. 154(b) by 0 days.

(21) Appl. No.: 11/958,734

(22) Filed: Dec. 18, 2007

(51) Int. Cl.
*G01L 7/00* (2006.01)
(52) U.S. Cl. .......................... 73/706; 73/716
(58) Field of Classification Search ............. 73/708, 73/706, 716
See application file for complete search history.

(56) References Cited

U.S. PATENT DOCUMENTS

| | | | |
|---|---|---|---|
| 4,304,294 A * | 12/1981 | Reisman et al. | 165/277 |
| 4,720,999 A | 1/1988 | Olson | 73/706 |
| 4,833,922 A | 5/1989 | Frick et al. | 73/706 |
| 4,862,317 A | 8/1989 | Kuisma | 361/283.1 |
| 4,970,898 A | 11/1990 | Walish et al. | 73/756 |
| 5,094,109 A | 3/1992 | Dean et al. | 73/718 |
| 5,524,492 A | 6/1996 | Frick et al. | 73/706 |
| 5,668,322 A | 9/1997 | Broden | 73/756 |
| 5,731,522 A | 3/1998 | Sittler | 73/708 |
| 5,760,310 A | 6/1998 | Rud et al. | 73/706 |
| 5,920,016 A | 7/1999 | Broden | 73/756 |
| 5,939,639 A | 8/1999 | Lethbridge | 73/724 |
| 6,059,254 A | 5/2000 | Sundet et al. | 248/678 |
| 6,079,276 A | 6/2000 | Frick et al. | 73/718 |
| 6,089,097 A | 7/2000 | Frick et al. | 73/718 |
| 6,484,585 B1 | 11/2002 | Sittler et al. | 73/718 |
| 6,510,740 B1 | 1/2003 | Behm et al. | 73/708 |
| 6,539,808 B2 | 4/2003 | Saenz et al. | 73/756 |
| 6,561,038 B2 | 5/2003 | Gravel et al. | 73/729.2 |
| 6,675,655 B2 | 1/2004 | Broden et al. | 73/716 |

(Continued)

FOREIGN PATENT DOCUMENTS

EP    0 306 189 A2    8/1988

(Continued)

OTHER PUBLICATIONS

International Search Report and Written Opinion from Application No. PCT/US2005/021151 with international filing date of Jun. 15, 2005.

(Continued)

*Primary Examiner*—Andre J Allen
(74) *Attorney, Agent, or Firm*—Westman, Champlin & Kelly, P.A.

(57) ABSTRACT

A direct mount for coupling a pressure transmitter to a process fluid of an industrial process includes a transmitter coupling configured to couple to a pressure transmitter. A process coupling is configured to couple an industrial process. A capillary tube extends between the transmitter coupling and the process coupling. A thermally conductive path having relatively high thermal conductivity extends between the process coupling and the transmitter coupling. Preferably, a thermal switch selectively thermally connects the thermally conductive path between the process coupling and the transmitter coupling.

28 Claims, 3 Drawing Sheets

U.S. PATENT DOCUMENTS

| | | | |
|---|---|---|---|
| 6,883,380 B2 | 4/2005 | Romo | 73/729.2 |
| 7,036,381 B2 | 5/2006 | Broden | 73/708 |
| 7,258,021 B2 | 8/2007 | Broden | 73/756 |
| 7,373,831 B2 | 5/2008 | Broden | 73/715 |
| 2002/0108448 A1* | 8/2002 | Behm et al. | 73/753 |
| 2004/0089075 A1* | 5/2004 | Behm et al. | 73/753 |
| 2005/0284227 A1 | 12/2005 | Broden et al. | 73/708 |
| 2006/0206288 A1 | 9/2006 | Brahmajosyula et al. | 702/183 |

FOREIGN PATENT DOCUMENTS

| | | |
|---|---|---|
| EP | 1 126 260 A1 | 8/2001 |
| EP | 1 255 099 A2 | 11/2002 |
| EP | 1 505 378 A1 | 2/2005 |
| JP | 11094671 | 4/1999 |
| WO | WO 96/27124 | 9/1996 |
| WO | WO 98/44326 | 10/1998 |
| WO | WO 2004/097361 | 11/2004 |

OTHER PUBLICATIONS

International Search Report and Written Opinion for Application No. PCT/US2007/005987, Aug. 8, 2007.

* cited by examiner

DIRECT MOUNT FOR PRESSURE TRANSMITTER WITH THERMAL MANAGEMENT

BACKGROUND OF THE INVENTION

The present invention relates to process control transmitters of the type used in industrial process monitoring and control systems. More specifically, the present invention relates to transmitters which measure process variables in high temperature or cold temperature environments.

Process monitoring and control systems are used to monitor and control operation of industrial processes. Industrial processes are used in manufacturing to produce various products such as refined oil, pharmaceuticals, paper, foods, etc. In large scale implementations, these processes must be monitored and controlled in order to operate within their desired parameters.

"Transmitter" has become a term which is used to describe the devices which couple to the process equipment and are used to sense a process variable. Example process variables include pressure, temperature, flow, and others. Frequently, a transmitter is located at a remote location (i.e., in the "field"), and transmits the sensed process variable back to a centrally located control room. Various techniques are used for transmitting the process variable including both wired and wireless communications. One common wired communication technique uses what is known as a two wire process control loop in which a single pair of wires is used to both carry information as well as provide power to the transmitter. One well established technique for transmitting information is by controlling the current level through the process control loop between 4 mA and 20 mA. The value of the current within the 4-20 mA range can be mapped to corresponding values of the process variable.

One type of transmitter is a pressure transmitter. In general, a pressure transmitter is any type of a transmitter which measures a pressure of a fluid of the process. (The term fluid includes both gas and liquids and their combination.) Pressure transmitters can be used to measure pressures directly including differential, absolute or gauge pressures. Further, using known techniques, pressure transmitters can be used to measure flows of the process fluid based upon a pressure differential in the process fluid between two locations.

Typically, a pressure transmitter includes a pressure sensor which couples to the pressure of the process fluid through an isolation system. The isolating system can comprise, for example, a isolation diaphragm which is in physical contact with the process fluid and an isolation fill fluid which extends between the isolation diaphragm and the pressure sensor. The fill fluid preferably comprises a substantially incompressible fluid such as oil. As the process fluid exerts a pressure on the isolation diaphragm, changes in the applied pressure are conveyed across the diaphragm, through the isolation fluid and to the pressure sensor. Such isolation systems prevent the delicate components of the pressure sensor from being directly exposed to the process fluid.

In some process environments, the process fluid may experience relatively high temperatures. However, transmitters typically have a maximum operating temperature of 250-300° F. Even in cases where the transmitter can withstand the high temperature, temperature extremes can still introduce errors in pressure measurements. In processes which have temperatures which exceed the maximum temperature of the pressure transmitter, the transmitter itself must be located remotely from the process fluid and coupled to the process fluid using a long capillary tube. The capillary tube can run many feet and an isolation fluid is carried in tube. One end of the tube mounts to the process through an isolation diaphragm and the other end of the tube couples to the pressure transmitter. This long capillary tube and isolation diaphragm is generally referred to as a "remote seal."

SUMMARY

A direct mount for coupling a pressure transmitter to a process fluid of an industrial process includes a transmitter coupling configured to couple to a pressure transmitter. A process coupling is configured to couple an industrial process. A capillary tube extends between the transmitter coupling and the process coupling. A thermally conductive path having relatively high thermal conductivity is provided which extends between the process coupling and the transmitter coupling. Preferably, a thermal switch selectively thermally connects the thermally conductive path between the process coupling and the transmitter coupling.

DETAILED DESCRIPTION

Providing high accuracy pressure measurements of high temperature processes can be difficult, especially in hot or cold ambient environments. The present invention provides techniques to address such difficulties.

A pressure transmitter, such as a transmitter configured to measure absolute, gauge or differential pressure, which is mounted to a high temperature process may overheat beyond the maximum operating temperature unless the transmitter is thermally isolated from the hot process. Typically, such thermal isolation can be achieved using a remote seal in which the pressure transmitter is separated or otherwise thermally isolated from the process. Pressure from the process fluid is conveyed to the pressure transmitter through a capillary tube. The capillary tube can be fluidically isolated from the process fluid using an isolation diaphragm. The isolation diaphragm contacts the process fluid and, as pressure is applied to the isolation diaphragm, the isolation diaphragm flexes and applies the pressure to the fill fluid in the capillary tube. The opposed end of the capillary tube couples to a pressure sensor, either directly or through a further isolation diaphragm.

One problem with such a remote seal configuration is that the isolation fill fluid which fills the capillary tube may degrade if exposed to temperature extremes. A fill fluid which is capable of surviving a relatively high temperature may not perform with sufficient accuracy at a relatively low temperature. One type of high temperature fill fluid (DC-704) does not function below 0° C. The fluid becomes so viscous it does not transmit pressure signals to the transmitter isolation diaphragms. However, many applications require pressure measurements of high temperature processes in cold ambient conditions. The present invention provides techniques for remotely positioning the transmitter from the process fluid to thereby isolate the transmitter from high temperature while still being capable of measuring process temperatures in excess of 200° C. even when the ambient temperature is below 0° C. The configurations also protect the transmitter in hot ambient temperatures.

Figure 1:
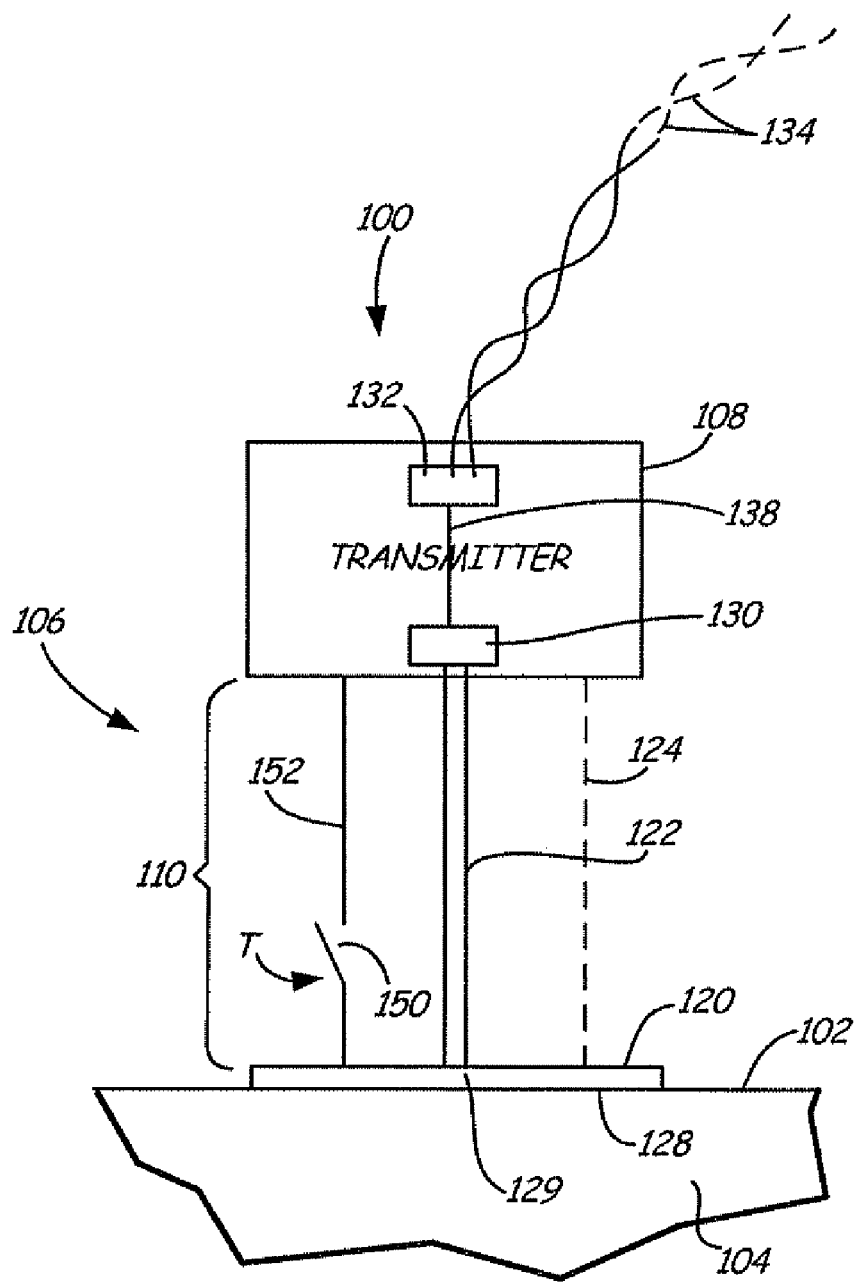
FIG. 1 is a diagram showing a pressure transmitter assembly in which a pressure sensor is spaced apart from an isolation diaphragm assembly to provide thermal isolation.

FIG. 1 is a diagram showing a pressure transmitter assembly in which a pressure sensor is spaced apart from an isolation diaphragm assembly to provide thermal isolation. FIG. 1 is a simplified diagram of an industrial process installation 100 which illustrates a pressure transmitter assembly 106 in accordance with the present invention. Process 100 includes a vessel 102 which contains a process fluid 104 therein. The transmitter assembly 106 includes a transmitter offset assembly 110 which mounts transmitter (transmitter module) 108 to vessel 102. Although the transmitter offset assembly 110 is illustrated as a separate component, it may be a component which is integral with the transmitter 108. Offset assembly 110 includes an isolation diaphragm assembly 120, a conduit 122 and a transmitter support 124. The isolation diaphragm assembly 120 includes an isolation diaphragm 128 which has a process interface side which faces and contacts the process fluid 104. An isolated cavity 129 is defined behind the isolation diaphragm 128. The capillary 122 couples to this cavity 129 and capillary 122 are filled with an isolation fill fluid. The isolation fill fluid is of a substantially incompressible liquid such as oil. The end of the capillary 122 which is opposite the isolation diaphragm assembly 120 couples to a pressure sensor 130. The pressure sensor provides an output to transmitter circuitry 132. Transmitter circuitry 132 is illustrated as coupled to a two wire process control loop 134. Alternatively, the transmitter may employ various wireless techniques. The pressure sensor 130 is electrically coupled to transmitter electronics 132 by electrical connection 138. In one specific embodiment, electrical connection 138 comprises a flex circuit.

The isolation diaphragm assembly 120 can be of any configuration and the diagram in FIG. 1 is provided for illustration purposes only. Similarly, the conduit 122, transmitter 108, pressure sensor 130 and transmitter electronics 132 can be of any desired configuration. The conduit 122 does not need to be straight or tubular as illustrated in FIG. 1 and any number of conduits may be employed in alternative configurations.

The transmitter support 124 physically mounts the transmitter 108 to the isolation diaphragm assembly 122 with a spaced apart orientation. Any desired transmitter support or configuration can be used. One example support 124 is one which completely encloses conduit 122 to protect the conduit 122 from the process environment. Another example transmitter support divides the space between vessel 102 and transmitter 108 to create a baffle to reduce or reflect radiation. The spacing between the process vessel 102 and the transmitter 108 provided by the offset assembly 110 provides thermal isolation therebetween. The thermal isolation can be achieved using materials with good insulation properties, through the use of an air gap, or through other techniques. The separation distance between the transmitter 108 and the process vessel 102 can be selected based upon the desired amount of thermal isolation for a particular installation. Increased spacing can be used in installations which have particularly hot process temperatures or with transmitters which include electronics or other components which are particularly sensitive to temperature extremes. Additionally, FIG. 1 provides a schematic representation of a thermal switch 150 which is arranged to selectively couple a thermal pathway 152 between the transmitter 108 and the process 104. In one specific configuration, the thermal switch 150 is closed at a temperature which is less than a particular threshold and opens when its temperature exceeds the threshold.

Figures 2A, 2B:
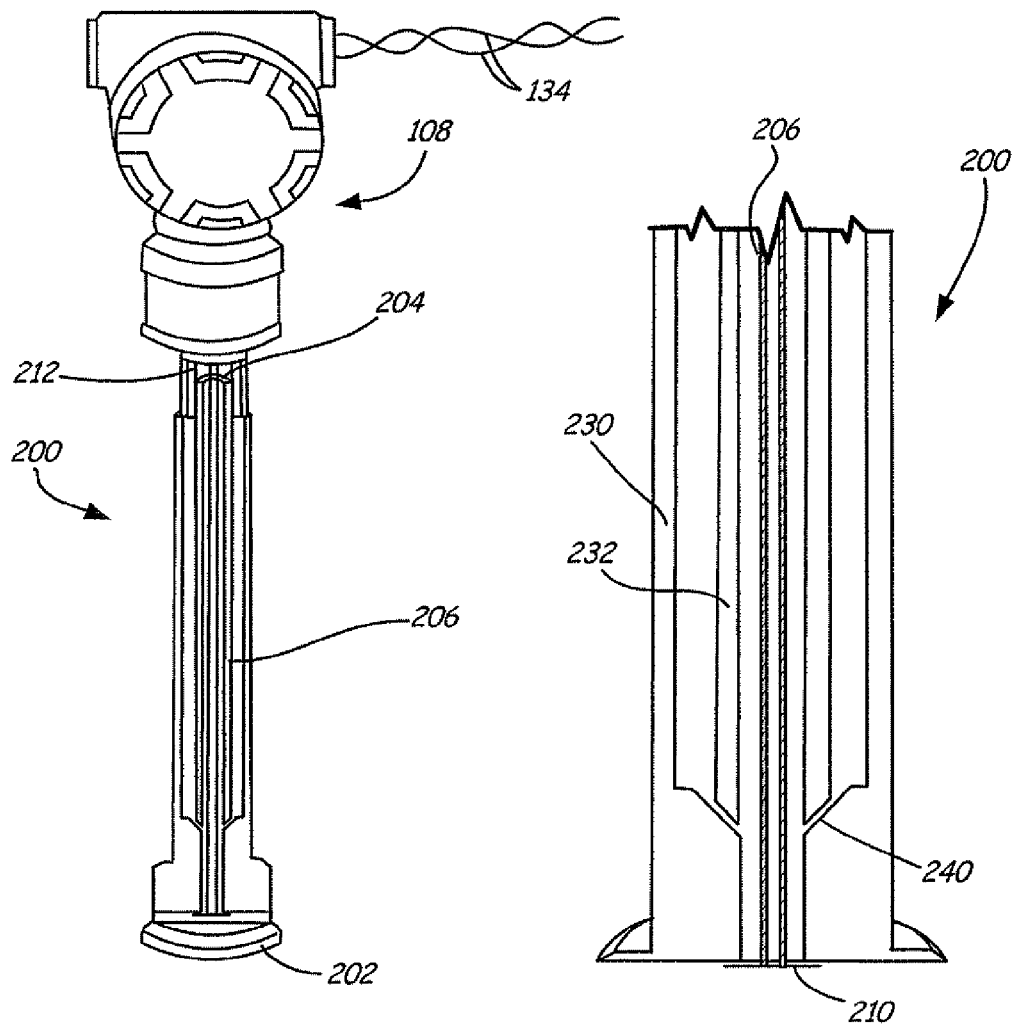
FIG. 2A is a partial cut away view of a pressure transmitter including a direct mount remote seal in accordance with one embodiment.
FIG. 2B is a cross sectional view of a portion of the direct mount remote seal of FIG. 2A.

FIG. 2A is a partially cut away plan view of pressure transmitter 108 and a direct mount 200 in accordance with one embodiment of the present invention. FIG. 2B is a more detailed cross sectional view of the direct mount 200. Direct mount 200 includes a process coupling end 202 and a transmitter coupling end 204. A capillary tube 206 extends between ends 202 and 204 and may be filled with a fill fluid such as a substantially incompressible oil or the like. In one configuration, each end 202 and 204 includes an isolation diaphragm 210, 212, respectively, to isolate and maintain the fill fluid within the capillary 206. In another configuration, an isolation diaphragm 210 is only positioned at the process coupling end 202 and the fill fluid contacts an isolation diaphragm (not shown) of the pressure transmitter 108.

In the embodiment of FIGS. 2A and 2B, the thermal switch 150 (shown I FIG. 1) is formed by a difference between the rate of thermal expansion of materials which causes a gap to form at higher temperatures. This gap causes a significant increase in the thermal resistance of the thermal pathway. Referring to FIG. 2B, the mount 200 is formed of a high thermal expansion outer sheath 230. For example, outer sheath 230 is comprised of stainless steel 316 SST. This material also has a relatively low thermal conductivity. An inner sheath 232 is formed of a low thermal expansion material such as a copper alloy and provides a thermally conductive pathway. The low thermal expansion material 232 should also have a relatively high thermal conductivity. As the temperature of the mount 200 increases, the high thermal expansion material 230 will expand at a rate which is greater than the low thermal expansion material 232 causing a gap 240 to form. This gap 240 causes the thermal pathway provided by material 232 to be substantially thermally disconnected from the industrial process. This provides a thermal shunt which opens at higher temperatures and is closed at low temperatures. For example, in a high temperature process application having a relatively high ambient temperature, the shunt will open and provide a relatively high thermal resistance thereby protecting the transmitter from overheating. However, in colder ambient temperatures, the shunt will close thereby providing a thermal pathway having relatively low thermal resistance. This allows heat from the process to flow to the transmitter isolation region, thereby maintaining the temperature of the fill fluid in capillary 206 in the region proximate transmitter 108 at a sufficiently high temperature to maintain functionality. For example, one model predicts that when the ambient air temperature is minus 40° C., the fill fluids at the transmitter 108 isolation diaphragm 212 will remain above 0° C. provided the process temperature remains above 200° C.

This configuration allows a pressure transmitter using a direct mount remote seal to measure the pressure of very high temperature processes in very cold, as well as very hot, ambient temperature conditions. Additionally, the configuration can act as a thermal "fuse" protecting the transmitter against overheating in cases where the process temperature rises above acceptable levels.

In one aspect, the configuration of the direct mount 200 substantially minimizes the thermal resistance between the process and the transmitter isolator region while the thermal switch is in a closes position and substantially maximizes the thermal resistance between the process and the transmitter isolator region when the thermal switch is in an open position.

The space between sheath 230 and 232 may be a vacuum or thermally non-conductive material to thereby insulate the inner heat conductor from the outer pipe and direct the heat along the capillary tube to the transmitter isolator region. Preferably, the structural design is configured to insure that the maximum stresses which the materials will experience will remain below the material fatigue endurance and creep limits for all operating conditions. Preferable materials include alloys of copper.

Figures 3A, 3B:
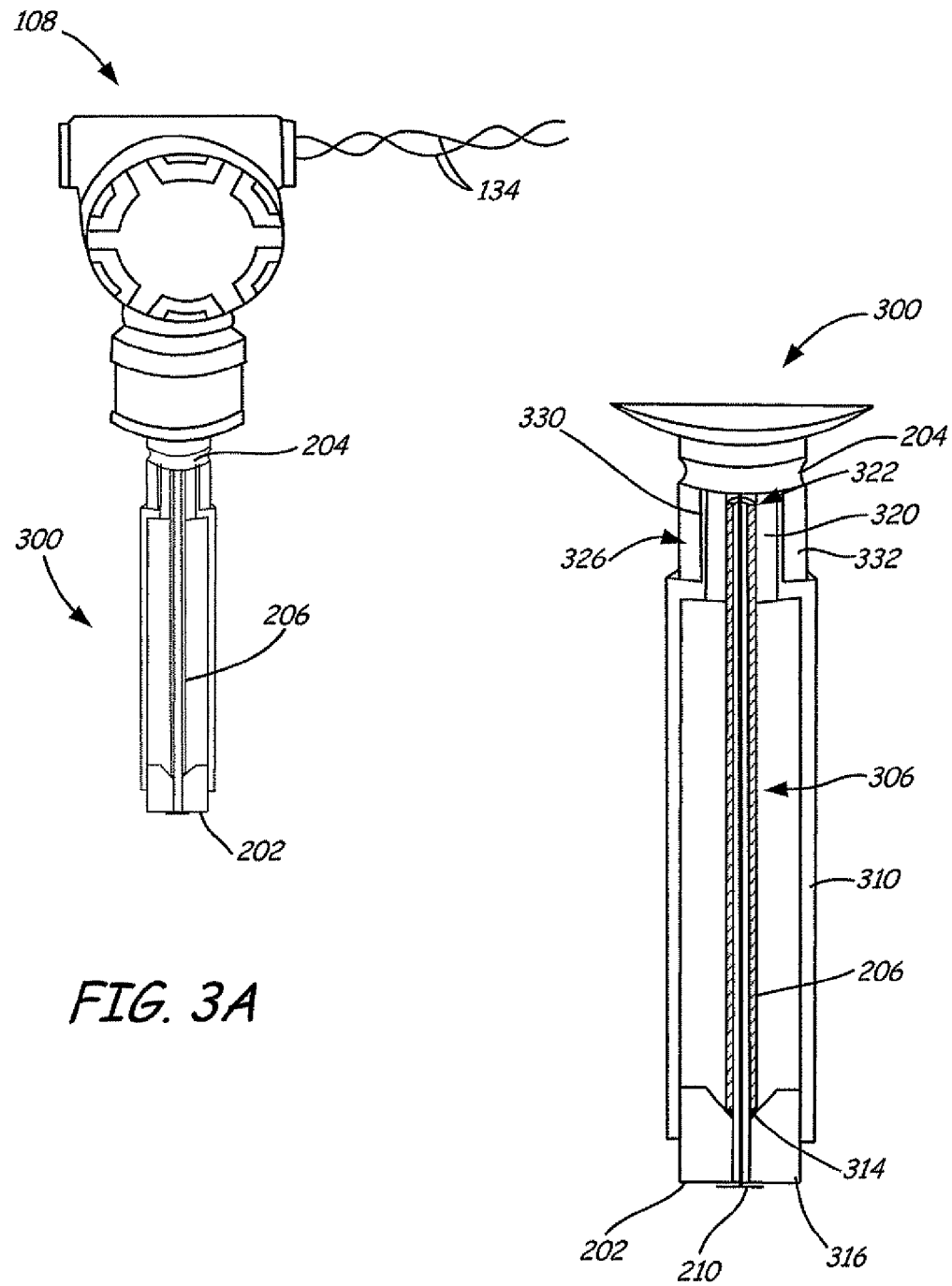
FIG. 3A is a partial cut away view of a pressure transmitter including a direct mount remote seal in accordance with one embodiment.
FIG. 3B is a cross sectional view of a portion of the direct mount remote seal of FIG. 3A.

FIG. 3A is a partially cut away plan view and FIG. 3B is an enlarged cut away plan view of direct mount 300 in accordance with another embodiment of the present invention. Items in FIGS. 3A and 3B which are similar to those shown in FIGS. 2A and 2B have retained their numbering. In the configurations of FIGS. 3A and 3B, the mount 300 provides a passive thermal optimization. More specifically, a highly thermally conductive material 306 such as copper extends around the capillary tube 206. A vacuum 308 provides thermal insulation between the high thermally conductive material 306 and the outer pipe 310. A thermal connection 314 is provided between the conductive material 306 and a fitting 316 at process coupling 202. The fitting 306 can comprise, for example, stainless steel and the connection with 314 can be through any appropriate techniques such as braising or bonding. A similar thermally connected interface 320 between thermally conductive material 306 and end coupling 322 near transmitter coupling 204. A thermal insulator 326 is positioned near the transmitter coupling 204 and located between the highly thermally conductive material 306 and a thin wall 330 of the outer tube 310. The thin wall 330 provides further thermal insulation between the conductive material 306 and a transmitter fitting 332.

In operation, the configuration shown in FIGS. 3A and 3B provides a passive thermal design which allows high temperature measurements to be made in very cold, as well as very hot ambient temperature conditions. In this configuration, the material 306 having a high thermal conductivity runs inside the pipe 310 and is configured to convey heat from the process through the process coupling 304. This conductive material 306 conducts sufficient heat during cold temperatures to maintain the fill fluid within capillary tube 206 at the transmitter coupling 204 at a sufficiently high temperature, for example, above 0° C. However, the thermal coupling is not sufficient to cause transmitter overheating during warm or hot ambient temperature conditions. This configuration also provides thermal insulation of the transmitter coupling 204 from the transmitter 108 and the surrounding environment. A vacuum may be provided within the outer pipe 310 in order to provide insulation between the high conductivity material 306 and the outer pipe 310. In one configuration, the invention as illustrated in FIGS. 2A and 2B having the thermal switch includes the passive thermal isolation design set forth in FIGS. 3A and 3B.

In various aspects, the present invention provides a temperature actuated thermal switch in which materials having dissimilar coefficients of expansion are utilized in a direct mount. The thermal switch is used to selectively conduct heat from a hot process along capillary tubing thereby maintaining the fill fluid within the remote seal system above its minimum operating temperature when used in cold ambient conditions. For example, this configuration can be utilized to allow a direct mount remote seal to measure pressures in high temperature processes, say 200° C. and 250° C., well in a very cold ambient environment, minus 40° C. or in a hot ambient temperature, for example, 40° C. on a hot sunny day. In a specific example, the thermal switch is actuated based upon temperature. The invention provides a variable thermal resistance which is adjustable depending on design implementation. In another aspect, a passive thermal design provides sufficient thermal resistance to protect the transmitter from overheating during hot weather, yet is capable of conducting sufficient heat from a hot process along the capillary tube during cold weather thereby maintains the capillary fill fluid above a minimum operating temperature. This configuration allows a direct mount remote seal to measure pressures in high temperature processes, for example 200° C. to 250° C., while in very cold ambient temperatures, for example minus 40° C. to 0° C., and in hot ambient temperatures, for example 40° C. on a sunny day.

Although the present invention has been described with reference to preferred embodiments, workers skilled in the art will recognize that changes may be made in form and detail without departing from the spirit and scope of the invention.

What is claimed is:

1. A direct mount for coupling a pressure transmitter to a process fluid of an industrial process comprising:
   a transmitter coupling configured to couple to a pressure transmitter;
   a process coupling configured to couple an industrial process;
   a capillary tube extending between the transmitter coupling and the process coupling;
   a thermally conductive path having relatively high thermal conductivity which extends between the process coupling and the transmitter coupling; and
   a thermal switch configured to selectively thermally connect the thermally conductive path between the process coupling and the transmitter coupling.

2. The apparatus of claim 1 wherein the thermal switch is responsive to temperature.

3. The apparatus of claim 1 wherein the thermal switch is formed by a gap between two materials.

4. The apparatus of claim 3 where the two materials have dissimilar coefficients of expansion thereby causing a size of the gap to change with temperature.

5. The apparatus of claim 1 including an isolation diaphragm configured to isolate a fill fluid in the capillary tube from the process fluid.

6. The apparatus of claim 1 including an outer casing.

7. The apparatus of claim 1 wherein the capillary tube is filled with a fill fluid.

8. The apparatus of claim 1 wherein the capillary tube is configured to convey a process pressure to the pressure transmitter.

9. The apparatus of claim 6 including a vacuum formed along the capillary tube between the outer casing and capillary tube.

10. The apparatus of claim 1 wherein the thermally conductive path comprises a material having a high thermal conductivity.

11. The apparatus of claim 1 wherein the thermally conductive path extends along the capillary tube.

12. The apparatus of claim 11 including a thermally conductive interface between the thermally conductive path and the industrial process.

13. The apparatus of claim 1 including a thermally conductive interface between the thermally conductive path and the pressure transmitter.

14. The apparatus of claim 1 wherein the thermal switch is open at high temperature and closed at lower temperature.

15. A method of coupling a pressure transmitter to a pressure of a process fluid of an industrial process comprising:
   coupling a capillary tube to the pressure of the process fluid;

coupling the pressure transmitter to the capillary tube;

providing a thermally conductive path along the capillary tube; and thermally isolating the thermally conductive path from a surrounding environment.

16. The method of claim 15 including selectively thermally coupling the thermally conductive path to the process fluid.

17. The method of claim 16 wherein selectively thermally coupling is based upon temperature.

18. The method of claim 16 wherein selectively thermally coupling comprises forming a gap between two materials.

19. The method of claim 18 where the two materials have dissimilar coefficients of expansion thereby causing a size of the gap to change with temperature.

20. The method of claim 15 including providing an isolation diaphragm configured to isolate a fill fluid in the capillary tube from the process fluid.

21. The method of claim 15 wherein the capillary tube is filled with a fill fluid.

22. The method of claim 15 wherein the capillary tube is configured to convey a process pressure to the pressure transmitter.

23. The method of claim 15 including providing a vacuum formed along the capillary tube between the capillary tube and an outer casing.

24. The method of claim 15 wherein the thermally conductive path comprises a material having a high thermal conductivity.

25. The method of claim 15 wherein the thermally conductive path extends along the capillary tube.

26. The method of claim 25 including providing a thermally conductive interface between the thermally conductive path and the industrial process.

27. The method of claim 15 including providing a thermally conductive interface between the thermally conductive path and the pressure transmitter.

28. The method of claim 25 or 26 including bonding the thermally conductive interface to the thermally conductive path.

* * * * *